Patented Dec. 11, 1951

2,577,865

UNITED STATES PATENT OFFICE 2,577,865

PROCESS FOR PREPARING METAL SALTS OF PENICILLIN

Max Tishler, Westfield, N. J., assignor to Merck & Co., Inc., Rahway, N. J., a corporation of New Jersey No Drawing. Original application September 11, 1946, Serial No. 696,350. Divided and this application February 25, 1950, Serial No. 146,410

4 Claims. (Cl. 260—239.1)

This application is a division of my pending joint application, Cram and Tishler, Serial No. 696,350, filed September 11, 1946, now United States Patent No. 2,542,796.

This invention relates to the isolation and purification of penicillin G from a mixture of various types of penicillin. More particularly, it is concerned with the preparation of novel derivatives of penicillin G which permit their ready separation.

It has been established with reasonable certainty that penicillin G, sometimes referred to as benzyl penicillin, has the structural formula

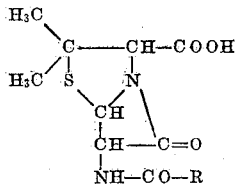

wherein R represents the benzyl group

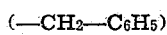

$(-CH_2-C_6H_5)$ Other forms of penicillin are of similar structure differing only in that the benzyl group is replaced by other monovalent organic radicals, generally radicals having five or more carbon atoms. Penicillins, such as penicillin F, wherein R is

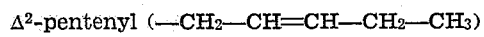

$\Delta^2$-pentenyl ($-CH_2-CH=CH-CH_2-CH_3$)

dihydropenicillin F, wherein R is n-amyl; penicillin X, wherein R is p-hydroxy benzyl and penicillin K, wherein R is n-heptyl have been identified. Although both saturated and unsaturated hydrocarbon radicals at R in the above formula give products having penicillin activity, it has been found that penicillin G is more efficacious than some of the other forms in therapy.

Penicillin is produced commercially as a mixture of these various types containing pigments and extraneous material. Since penicillin G is one of the most active forms, it is desirable that it be separated from the less active types as well as extraneous impurities.

In accordance with one method of isolating penicillin G, described in a penicillin report submitted by the Heyden Chemical Corporation to the O. S. R. D. (O. S. R. D. No. H-II, May 22, 1944, and O. S. R. D. No. H-III, June 15, 1944), an ether solution of triethylamine was added to an ether solution of crude penicillin and a precipitation of impurities effected. Upon further addition of an ether solution of triethylamine to the penicillin solution, a mixture of oil and crystals formed. The ether was decanted from the crystals and the white crystals of triethylamine penicillin washed with acetone. A procedure for conversion from the triethylamine penicillin salt to the sodium salt was recorded. It consisted of dissolving the triethylamine salt in water, acidifying, extracting into ether, and back into water by the portionwise addition of sodium hydroxide. This mixture was then frozen, dried under vacuum and recrystallized from butanol and water. The above procedure, however, does not give high yields of penicillin G and is therefore not economical for manufacture.

It is an object of this invention to provide a practical process for the isolation and purification of penicillin G from a mixture, which can be readily carried out and does not result in significant losses of penicillin.

This improved method for isolation and purification of penicillin G includes the steps of treating an organic solvent solution of penicillin acid with an organic solvent solution of an N-substituted heterocyclic amine to form the tertiary amine salt of penicillin G, recovering the latter compound and converting the same to an alkali or alkaline earth metal salt of essentially pure penicillin G.

The first step of the overall process, i. e., the formation of the tertiary amine salt is fully disclosed and claimed in said pending application of Cram and Tishler, Serial No. 696,350, filed September 11, 1946, typical tertiary amine salts prepared according to said process including the N-methylpiperidine, N-ethylpiperidine, N-methylmorpholine and N-ethylmorpholine salts of penicillin G.

Regarded in certain of its broader aspects, the process in accordance with the present invention comprises converting a tertiary amine salt of penicillin G to an alkali metal or alkaline earth metal salt of penicillin G by dissolving the tertiary amine salt in an aqueous organic solvent mixture, reacting the latter mixture with an alkali forming metal hydroxide, and recovering the corresponding alkaline salt of penicillin G from the aqueous phase. By the term "alkali forming" hydroxide as used here is meant any alkali metal or alkaline earth metal hydroxide.

By way of illustration, conversion of the N-ethylpiperidine salt of penicillin G to sodium penicillin G or calcium penicillin G is accomplished by dissolving the N-ethylpiperidine salt in water and adding amyl acetate. Sufficient dilute sodium hydroxide or calcium hydroxide is added to the above mixture to adjust the pH of the solution to approximately 6.5. The alkali is added at such a rate that the temperature of the reaction does not exceed 3° C. In this manner the sodium or calcium penicillin G is extracted into the aqueous layer and the N-ethylpiperidine is extracted into the amyl acetate. The two layers are separated. The aqueous layer is washed with amyl acetate. Amorphous sodium penicillin is recovered from the aqueous solution by freezing the solution and drying under vacuum. An essentially pure product is obtained. N-ethylpiperidine is soluble in amyl acetate, and can be recovered from the amyl acetate layer.

The amorphous sodium penicillin G thus obtained can be crystallized by stirring the product with butanol until solution is accomplished. Crystallization begins almost immediately.

The following example illustrates a method of carrying out the present invention. It is to be understood that this example is given by way of illustration and not of limitation.

Example

The N-ethylpiperidine salt of penicillin G is converted to pure sodium penicillin G by dissolving 6.0 g. of the pure N-ethylpiperidine salt in 35.8 cc. of cold water (carbon dioxide free) and covering the aqueous layer with 67 cc. of cold amyl acetate. The mixture is stirred at 0° C. and treated with 13.5 cc. of 0.9955 N sodium hydroxide (carbonate free). The alkali is added at such a rate that the temperature does not exceed 3° C. The two layers are separated and the aqueous layer extracted two times with 35 cc. of cold amyl acetate. The aqueous layer which has a pH of 7, is frozen and dried under vacuum to give 4.78 g. of essentially pure colorless sodium penicillin G. This represents 100% of theory. The product had an optical rotation $(\alpha)_{25}^D = 292.5°$ when 100 mg. was measured in 25 cc. water.

Bioassay showed *S. aureus* 1652 u./mg.

If calcium hydroxide is used in place of sodium hydroxide, pure calcium penicillin G is obtained.

The above represents a 76% overall recovery of activity from clinical penicillin as sodium penicillin G.

Anal. calcd. for $C_{16}H_{17}N_2SO_4Na$
　　　　　　　　C, 53.93; H, 4.81; N, 7.86
Found　　　　C, 54.08; H, 5.02; N, 7.74

The N-ethylpiperidine is recovered from the amyl acetate layer by adding 2.5 N hydrochloric acid to the amyl acetate until acid to moist Congo. The layers are separated and the aqueous layer made alkaline with 30% sodium hydroxide. The N-ethylpiperidine is separated, dried over potassium hydroxide pellets and distilled at atmospheric pressure.

Crystallization of the sodium penicillin G obtained above is accomplished by stirring a mixture of 5.0 g. of the product and 15 cc. of butanol until the sodium penicillin G dissolves and then crystallizes from solution. The mixture is cooled at 0° C. for five hours, filtered, slurried two times with a minimum volume of acetone and dried in vacuo. 4.66 g. (93.2% recovery) of crystalline sodium penicillin G is obtained.

Various changes and modifications in the foregoing procedure will occur to those skilled in the art, and to the extent that such changes and modifications are embraced by the appended claims, it is to be understood that they constitute part of my invention.

I claim:

1. The process which comprises reacting a tertiary amine salt of penicillin with an aqueous solution of an alkali forming hydroxide selected from the group consisting of alkali metal hydroxides and alkaline earth metal hydroxides in the presence of a substantially water-immiscible organic solvent and recovering the corresponding metal salt of penicillin from the reaction mixture.

2. The process which comprises reacting a tertiary amine salt of penicillin with an aqueous solution of sodium hydroxide in the presence of a substantially water-immiscible organic solvent and recovering the sodium salt of penicillin from the reaction mixture.

3. The process which comprises reacting the N-ethyl piperidine salt of penicillin with an aqueous solution of sodium hydroxide in the presence of a substantially water-immiscible organic solvent and recovering the sodium salt of penicillin from the reaction mixture.

4. The process which comprises reacting the N-ethyl piperidine salt of penicillin with an aqueous solution of calcium hydroxide in the presence of a substantially water-immiscible organic solvent and recovering the calcium salt of penicillin from the reaction mixture.

MAX TISHLER.

No references cited.